(12) United States Patent
Roch et al.

(10) Patent No.: US 9,736,058 B2
(45) Date of Patent: Aug. 15, 2017

(54) MULTI-REGION SOURCE ROUTED MULTICAST USING SUB-TREE IDENTIFIERS

(71) Applicant: Huawei Technologies Co., Ltd., Shenzhen (CN)

(72) Inventors: Evelyne Roch, Gatineau (CA); Mehdi Arashmid Akhavain Mohammadi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 111 days.

(21) Appl. No.: 14/717,812

(22) Filed: May 20, 2015

(65) Prior Publication Data

US 2016/0344616 A1    Nov. 24, 2016

(51) Int. Cl.
*H04L 12/761*     (2013.01)
*H04L 12/721*     (2013.01)
*H04L 29/06*      (2006.01)
*H04L 12/753*     (2013.01)

(52) U.S. Cl.
CPC .......... *H04L 45/16* (2013.01); *H04L 29/0653* (2013.01); *H04L 45/34* (2013.01); *H04L 45/48* (2013.01)

(58) Field of Classification Search
CPC ......... H04L 45/16; H04L 45/34; H04L 45/38; H04L 49/254; H04L 29/0653
See application file for complete search history.

(56) References Cited

U.S. PATENT DOCUMENTS

2005/0068954 A1* 3/2005 Liu ............... H04L 12/1854
                                                  370/390
2015/0207736 A1   7/2015 Roch et al.
2015/0312136 A1  10/2015 Roch

FOREIGN PATENT DOCUMENTS

| CN | 101222511 A | 7/2008 |
| CN | 102421162 A | 4/2012 |
| WO | 2007095331 A2 | 8/2007 |

* cited by examiner

*Primary Examiner* — Jianye Wu
(74) *Attorney, Agent, or Firm* — Slater Matsil, LLP

(57) ABSTRACT

A controller transmits a data packet to a node in a source routed forwarding network having a plurality of nodes configured to transfer data packets to one another via a plurality of links. The data packet includes a header. The header includes a source routed hop list defining a path of the data packet. The data packet is associated with a flow of data packets from a source to one or more destinations. The hop list includes a sub-tree identifier indicative of a multicast sub-tree.

21 Claims, 3 Drawing Sheets

MULTI-REGION SOURCE ROUTED MULTICAST USING SUB-TREE IDENTIFIERS

TECHNICAL FIELD

The present invention is generally directed to network communications, and more particularly to source routed forwarding solutions for multicast traffic.

BACKGROUND

Source routed forwarding solutions for multicast traffic are space consuming, i.e. result in large packet headers, limiting usage to very small multicast trees. Source routed multicast headers typically include multi-protocol label switching (MPLS) based stacked headers requiring a fixed 32 bits per label stack entry, each header representing an output interface. Other header representations may be used and are within the scope of this disclosure, and limitation to MPLS label representations is not to be inferred. During the source routed forwarding of data packets through the network, each of the intermediate nodes in the network receiving the data packet looks at the packet header to determine the next hop for the data packet. This is in contrast to having the intermediate nodes look at a routing table to determine the next hop. A source routed multicast tree may be represented by adding a header label entry for each link. Each link has two interfaces, one at each end of the link and therefore an entry may also be represented by inserting a header label for an outgoing interface for that link. The more links are traversed by each data packet, the more overhead that is added.

For large multicast trees, i.e., those traversing a large number of links, this fixed size header label approach for each link may become too long and generate too much overhead, becoming inefficient and limiting the size of multicast trees.

SUMMARY

This disclosure is directed to source routed multicast forwarding using multicast sub-tree identifiers.

In one example embodiment, a method includes transmitting, by a network controller in a source routed forwarding network, to a node in the source routed forwarding network, a data packet including a header. The header includes a source routed hop list defining a path of the data packet. The data packet is associated with a flow of data packets from a source to one or more destinations. The hop list includes a sub-tree identifier indicative of a multicast sub-tree.

In another example embodiment, a method includes receiving, by a node in a source routed forwarding network, a data packet from a network controller, the data packet including a header. The header includes a source routed hop list defining a path of the data packet. The data packet is associated with a flow of data packets from a source to one or more destinations. The hop list includes a sub-tree identifier indicative of a multicast sub-tree.

Other example embodiments include a network controller and a network node configured to perform the respective methods.

BRIEF DESCRIPTION OF THE DRAWINGS

For a more complete understanding of the present disclosure, and the advantages thereof, reference is now made to the following description taken in conjunction with the accompanying drawings, wherein like numbers designate like objects, and in which.

DETAILED DESCRIPTION

Figure 1:
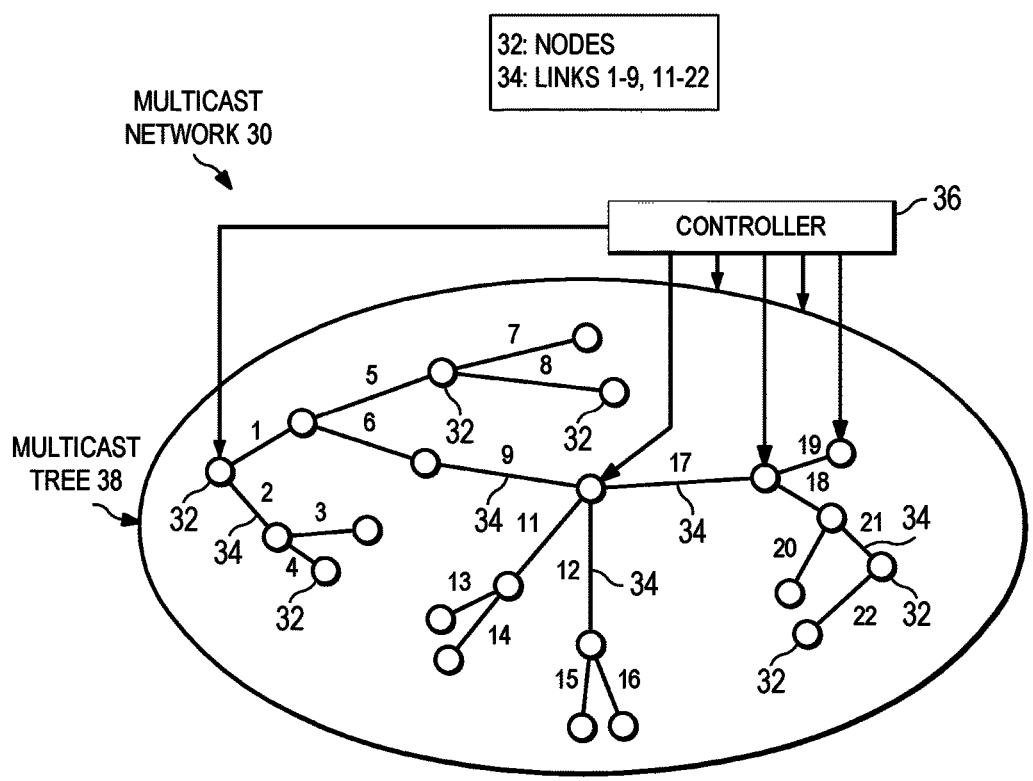
FIG. 1 illustrates a multicast network having a controller and a plurality of nodes, each node having a plurality of directional links.

Referring to FIG. 1, there is shown a multicast network 30 that includes a plurality of nodes 32 each having a plurality of links 34. A central network controller 36 gathers all the network topology including all nodes 32 and links 34, including operator provisioned or automatically discovered optional input, such as existing or planned multicast traffic flows, additional planned nodes, or additional planned links.

The controller 36 computes a multicast tree 38 for a multicast traffic source and sends the encoded tree to the source node 32. The source node 32 adds the encoded tree to a header, the header including a hop list. Source routed multicast headers typically include multi-protocol label switching (MPLS) based stacked headers requiring a fixed 32 bits per label stack entry, where each header represents an output interface. Other header representations may be used and are within the scope of this disclosure, and limitation to MPLS label representations is not to be inferred.

As new receivers are added to multicast trees 38 or new trees are created, the network controller 36 updates the headers for the flows and monitors the size of the header. The tree itself might be reshaped as a result. In such cases, the controller might remove or add duplication points accordingly. So, not only can headers change, but the distribution points can also change. The various changes depend on how the controller computes the multicast tree.

Figure 2:
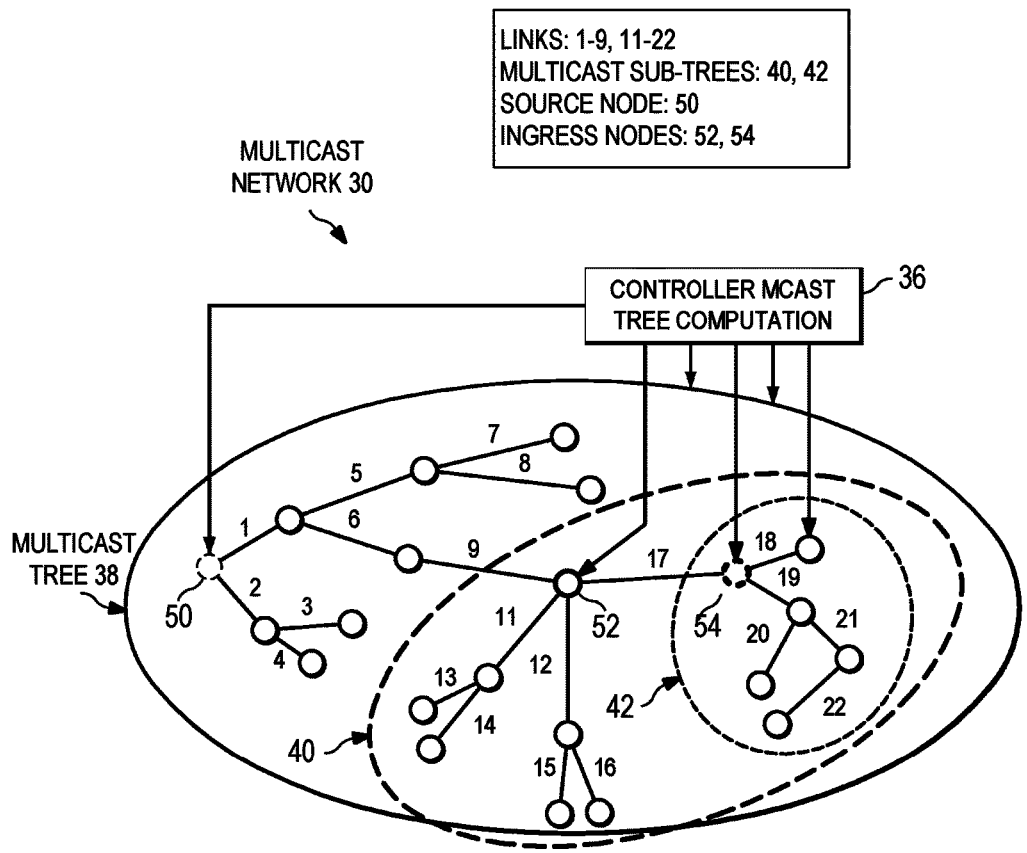
FIG. 2 illustrates the multicast network showing the controller providing multicast tree computation including sub-tree identifiers according to one embodiment.

Referring to FIG. 2, according to one embodiment of this disclosure, the multicast tree representation created by the controller 36 includes identifiers for multicast sub-trees as part of the hop list. The controller 36 includes path computation hardware, such as a processor and memory, and/or software that determines a path for multicast traffic from one source node 32 to one or more destination nodes 32. Then, the controller 36 divides multicast tree 38 into n sub-trees, shown as sub-trees 40 and 42 in FIG. 2. The controller 36 determines the n number of ingress nodes of sub-trees that result in a good tradeoff between the number of sub-trees to configure and the overhead of the multicast packet across the entire multicast tree 38. In the example shown in FIG. 2, the ingress node 50 feeds all nodes 32 and links 34 in the multicast tree 38. The ingress node 52 feeds the nodes 32 and links 14 in the sub-tree 40, shown as links 11-17. The ingress node 54 feeds the nodes 32 and links 34 in the sub-tree 42, shown as links 18-22.

The controller 36 constructs a multicast tree source routed header representation, referred to as a hop list, and provides it to the source node 50. The hop list may include one or more multicast sub-tree identifiers. Each multicast sub-tree identifier identifies a list of hops to be included in the header over one or more interfaces. For example, in FIG. 2, a multicast sub-tree identifier {MCAST SUB-TREE 40 ID} can be used to identify the sub-tree 40, and the sub-tree 40 includes the links 11-17. The source routed header representation includes an ordered set of entries, where each entry may include an MPLS label, an IPv4 address, an IPv6 address, a type length value (TLV) encoding, or any other mechanism by which the switch can identify a corresponding entry representing a sub tree header programmed by the controller. The controller 36 gives the hop list to the ingress node 52 of the sub-tree 50 and the ingress node 54 of the sub-tree 42. Then the ingress nodes 52-54 can reference a mapping table, such as a look-up table stored at the node 52-54 to determine a mapping between the one or more multicast sub-tree identifiers in the hop list and the nodes represented by each multicast sub-tree identifier. The mapping table can be provided by the controller 36 to each ingress node 52-54 in an earlier configuration message.

At the source node 50, the source route includes instructions for each node 32 to replicate the packet m times and send it on to further nodes 32 over interfaces $i_1$ to $i_m$, or follow instructions for the sub-tree identifier.

At each node 32, the next hop is examined. When the next hop represents a regular replication, the data packet is replicated by the node 32 and sent on all interfaces specified for that hop. When the next hop is a multicast sub-tree identifier, the node 32 (which may be an ingress node for the respective sub-tree, such as the ingress nodes 52-54) uses the multicast sub-tree identifier and the mapping table stored at the node 32 and substitutes the multicast sub-tree identifier with a representation of nodes and interfaces in that sub-tree over which to replicate the data packet. The node 32 also removes the multicast sub-tree identifier from the source route.

As shown in the example in FIG. 2, for the flow f on the multicast tree 38, the controller 36 instructs nodes in the network 30 as follows:

The controller 36 instructs the ingress node 50 to forward packets on multicast tree 38 as follows:

Send a data packet on link 1 with a header that includes hop list {5 {7,8}, 6 {9 {sub-tree 40 mcast id}}};

Send the data packet on link 2 with a header that includes hop list {3,4}.

The controller 36 instructs the ingress node 52 to forward packets on the multicast sub-tree 40 as follows:

Send the data packet on link 11 with a header that includes hop list {13,14};

Send the data packet on link 12 with a header that includes hop list {15,16};

Send the data packet on link 17 with a header that includes hop list {sub-tree 42 mcast id}.

The controller 36 instructs the ingress node 54 to forward packets on the multicast sub-tree 42 as follows:

Send the data packet on link 18 with a header that includes hop list { };

Send the data packet on link 19 with a header that includes hop list {21 {22}, 20}.

In an alternative embodiment, instead of forwarding the header to each node 32, instructions to construct the header could be forwarded to each node 32. For example, the forwarded information with the data packet could be a header representation, or instructions in the form of multiple messages between the controller and node, one per hop to show up in the header. In such an embodiment, when the node 32 receives the forwarded information, the node 32 uses the header representation or instructions to construct the header.

Figure 3:
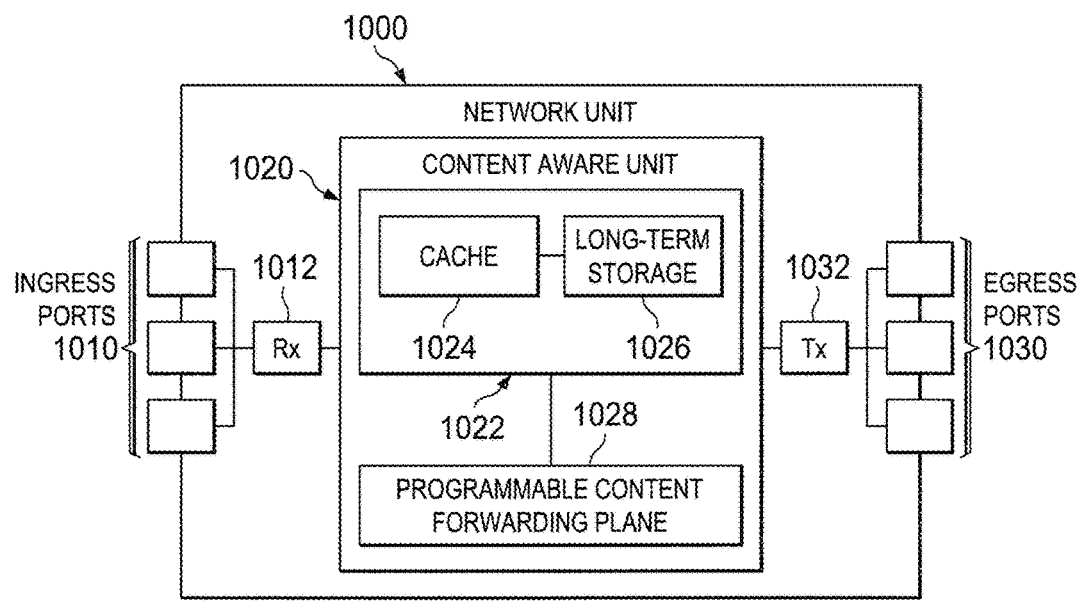
FIG. 3 illustrates an embodiment of a network unit in a multicast network.

FIG. 3 illustrates an embodiment of a network unit 1000, which may be any device that transports and processes data through the network 30. For instance, the network unit 1000 may correspond to or may be located in any of the system nodes described above, such as the controller, nodes and branches of FIGS. 1 and 2. The network unit 1000 may be configured to implement or support the schemes and methods described above. The network unit 1000 may include one or more ingress interfaces or units 1010 coupled to a receiver (Rx) 1012 for receiving signals and frames/data from other network components. The network unit 1000 may include a content aware unit 1020 to determine which network components to send content to. The content aware unit 1020 may be implemented using hardware, software, or both. The network unit 1000 may also include one or more egress interfaces or units 1030 coupled to a transmitter (Tx) 1032 for transmitting signals and frames/data to the other network components. The receiver 1012, content aware unit 1020, and transmitter 1032 may also be configured to implement at least some of the disclosed schemes and methods above, which may be based on hardware, software, or both. The components of the network unit 1000 may be arranged as shown in FIG. 3.

The content aware unit 1020 may also include a programmable content forwarding plane block 1028 and one or more storage blocks 1022 that may be coupled to the programmable content forwarding plane block 1028. The programmable content forwarding plane block 1028 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, and FIB) at the content aware unit 1020 or the network unit 1000. The programmable content forwarding plane block 1028 may interpret user requests for content and accordingly fetch content, e.g., based on meta-data and/or content name (prefix), from the network or other content routers and may store the content, e.g., temporarily, in the storage blocks 1022. The programmable content forwarding plane block 1028 may then forward the cached content to the user. The programmable content forwarding plane block 1028 may be implemented using software, hardware, or both and may operate above the IP layer or L2.

The storage blocks 1022 may include a cache 1024 for temporarily storing content, such as content that is requested by a subscriber. Additionally, the storage blocks 1022 may include a long-term storage 1026 for storing content relatively longer, such as content submitted by a publisher. For instance, the cache 1024 and the long-term storage 1026 may include Dynamic random-access memories (DRAMs), solid-state drives (SSDs), hard disks, or combinations thereof.

Figure 4:
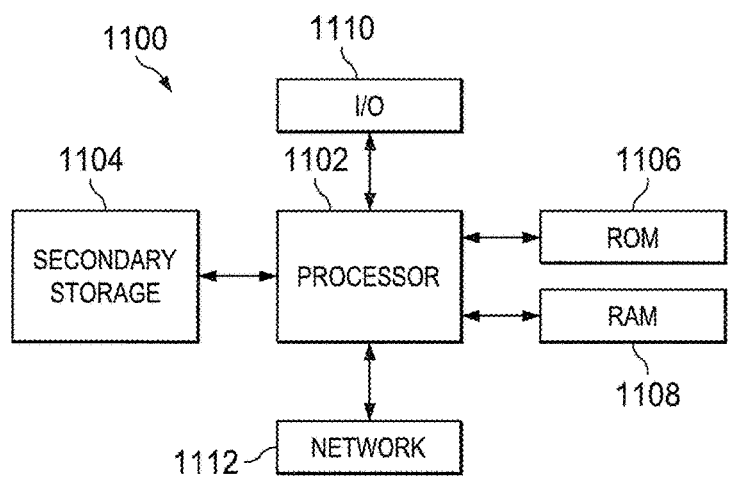
FIG. 4 illustrates a general-purpose network component for use in a multicast network.

The network components described above may be implemented on any general-purpose network component, such as a computer or network component with sufficient processing power, memory resources, and network throughput capability to handle the necessary workload placed upon it. FIG. 4 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 typically includes one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    generating, by a network controller in a source routed forwarding network, a header portion comprising a hop list defining a source-routed path of a data packet, the data packet associated with a flow of data packets from a source to one or more destinations, wherein the hop list includes a sub-tree identifier, the sub-tree identifier being indicative of a multicast sub-tree; and
    transmitting, by the network controller to a node in the source routed forwarding network, the generated header portion comprising the hop list defining the source-routed path of the data packet.

2. The method of claim 1, wherein the sub-tree identifier represents a multicast sub-tree ingress node and a plurality of nodes and links forming the multicast sub-tree.

3. The method of claim 2, wherein the sub-tree identifier is convertible by the node into a sub-tree hop list comprising the plurality of nodes and links of the multicast sub-tree.

4. The method of claim 1, wherein the sub-tree identifier comprises:
    a multi-protocol label switching (MPLS) label;
    an IPv4 address;
    an IPv6 address; or
    a type length value (TLV) encoding.

5. A method comprising:
    receiving, by a node in a source routed forwarding network, a data packet from a network controller, the data packet comprising a header, the header comprising a hop list defining a source-routed path of the data packet, the data packet associated with a flow of data packets from a source to one or more destinations, wherein the hop list includes a sub-tree identifier, the sub-tree identifier being indicative of a multicast sub-tree; and
    forwarding, by the node, the data packet in accordance with the hop list.

6. The method of claim 5, wherein the sub-tree identifier represents a multicast sub-tree ingress node and a plurality of nodes and links forming the multicast sub-tree.

7. The method of claim 6, further comprising:
    converting the sub-tree identifier into a sub-tree hop list comprising the plurality of nodes and links forming the multicast sub-tree.

8. The method of claim 6, further comprising:
    based on the hop list, transmitting the data packet to one or more of the plurality of nodes forming the multicast sub-tree.

9. The method of claim 8, further comprising:
    updating the header of the data packet before transmitting the data packet to the one or more of the plurality of nodes forming the multicast sub-tree.

10. The method of claim 5, wherein the sub-tree identifier comprises:
    a multi-protocol label switching (MPLS) label;
    an IPv4 address;
    an IPv6 address; or
    a type length value (TLV) encoding.

11. In a source routed forwarding network, a network controller comprising:
    a non-transitory memory storage comprising instructions; and
    at least one processing unit in communication with the memory storage, wherein the at least one processing unit executes the instructions to:
        generate, a header portion comprising a hop list defining a source-routed path of a data packet, the data packet associated with a flow of data packets from a source to one or more destinations, wherein the hop list includes a sub-tree identifier, the sub-tree identifier being indicative of a multicast sub-tree; and
        transmit, to a node in the network, the generated header portion comprising the hop list defining the source-routed path of the data packet.

12. The network controller of claim 11, wherein the sub-tree identifier represents a multicast sub-tree ingress node and a plurality of nodes and links forming the multicast sub-tree.

13. The network controller of claim 12, wherein the sub-tree identifier is convertible by the node into a sub-tree hop list comprising the plurality of nodes and links of the multicast sub-tree.

14. The network controller of claim 11, wherein the at least one processing unit is further configured to determine a number of multicast sub-tree ingress nodes and links and associated sub-trees in the source-routed path.

15. The network controller of claim 11, wherein the sub-tree identifier comprises:
    a multi-protocol label switching (MPLS) label;
    an IPv4 address;
    an IPv6 address; or
    a type length value (TLV) encoding.

16. In a source routed forwarding network, a network node comprising:
    a non-transitory memory storage comprising instructions; and
    at least one processing unit in communication with the memory storage, wherein the at least one processing unit executes the instructions to:

receive a data packet from a network controller, the data packet comprising a header, the header comprising a hop list defining a source-routed path of the data packet, the data packet associated with a flow of data packets from a source to one or more destinations, wherein the hop list includes a sub-tree identifier, the sub-tree identifier being indicative of a multicast sub-tree; and forward the data packet in accordance with the hop list.

17. The network node of claim 16, wherein the sub-tree identifier represents a multicast sub-tree ingress node and a plurality of nodes and links forming the multicast sub-tree.

18. The network node of claim 17, wherein the at least one processing unit is further configured to convert the sub-tree identifier into a sub-tree hop list comprising the plurality of nodes and links forming the multicast sub-tree.

19. The network node of claim 18, wherein the at least one processing unit is further configured to:
based on the hop list, transmit the data packet to one or more of the plurality of nodes forming the multicast sub-tree.

20. The network node of claim 19, wherein the at least one processing unit is further configured to:
update the header of the data packet before transmitting the data packet to the one or more of the plurality of nodes forming the multicast sub-tree.

21. The network node of claim 16, wherein the sub-tree identifier comprises:
a multi-protocol label switching (MPLS) label;
an IPv4 address;
an IPv6 address; or
a type length value (TLV) encoding.

* * * * *